United States Patent [19]

Freeman

[11] Patent Number: 4,863,771
[45] Date of Patent: Sep. 5, 1989

[54] HOLLOW FIBER REINFORCED STRUCTURE AND METHOD OF MAKING SAME

[75] Inventor: Richard B. Freeman, Wilmington, Del.

[73] Assignee: The Budd Company, Troy, Mich.

[21] Appl. No.: 136,187

[22] Filed: Dec. 21, 1987

Related U.S. Application Data

[63] Continuation of Ser. No. 768,259, Aug. 22, 1985.

[51] Int. Cl.$^4$ .......................... B60J 5/00; B28B 7/32
[52] U.S. Cl. .................... 428/36.1; 264/257; 264/258; 264/314; 296/187; 296/205; 428/174; 428/188; 428/245; 428/286; 428/289
[58] Field of Search ............... 428/35, 289, 188, 286, 428/174, 245, 36.1; 264/257, 258, 314; 296/187, 205

[56] References Cited

U.S. PATENT DOCUMENTS

| | | | |
|---|---|---|---|
| Re. 25,241 | 9/1962 | Randolph | 264/258 |
| 3,128,322 | 4/1964 | Young | 264/314 |
| 3,832,109 | 8/1974 | Ranallo et al. | 264/314 |
| 3,937,781 | 2/1976 | Allen | 264/258 |
| 3,967,996 | 7/1976 | Kamov et al. | 156/156 |
| 4,126,659 | 11/1978 | Blad | 264/314 |
| 4,314,964 | 2/1982 | Ferrary | 264/513 |
| 4,338,070 | 7/1982 | Nava | 425/112 |
| 4,418,031 | 11/1983 | Doerer et al. | 428/288 |
| 4,446,092 | 5/1984 | Bliley | 264/314 |
| 4,483,731 | 11/1984 | Dohle et al. | 264/314 |
| 4,740,346 | 4/1988 | Freeman | 264/314 |

Primary Examiner—Ellis P. Robinson
Assistant Examiner—James J. Seidleck
Attorney, Agent, or Firm—Harness, Dickey & Pierce

[57] ABSTRACT

A hollow fiber reinforced structure having irregular cross-sections, curvatures, joints and twists is provided. A method of forming the structure includes placing fibrous material on the walls of an outer mold and placing a bladder internal to the fibrous material, which serves as an inner mold. When the mold is closed and the bladder expanded, resin is injected into the fibrous material. After curing, the solid reinforced structure is formed.

9 Claims, 2 Drawing Sheets

HOLLOW FIBER REINFORCED STRUCTURE AND METHOD OF MAKING SAME

This is a continuation of United States patent application Ser. No. 768,259, filed Aug. 22, 1985, entitled "Hollow Fiber Reinforced Structure and Method of Making Same".

BACKGROUND OF THE INVENTION

Pultrusion of fiber reinforced composite materials has been used to produce constant cross-sectional hollow structures. However, many structures using hollow members require that they have varying cross-sectional geometry as well as part curvature, twists and joints. Such hollow members may, for example, involve automotive space frames, aircraft hulls and the like.

To date such hollow members or structures have typically been fabricated using a core material as the inner mold. A lightweight urethane foam is generally machined or cast to the correct geometry if the core is to be left inside the structure formed. The core may be dissolved or melted after the hollow structure is cured if the core is to be removed.

When such a core is used, the composite material is either applied wet, preimpregnated with resin, or as a dry reinforcement. When a dry reinforcement composite material is used, resin is subsequently pumped into the material after closing of the mold.

In some cases, inflatable molds have been used to cure outer skins for helicopter rotor blades. In these cases, preimpregnated fibrous reinforcemnt was involved and the inflatable mold had to be carefully fabricated to a specific size and shape.

OBJECTS OF THE INVENTION

It is an object of this invention to provide an improved fiber reinforced structure and method of manufacturing it.

It is a further object of this invention to provide an improved method of using an inflatable bladder as an inner mold where the dimensions of the bladder are not critical.

BRIEF SUMMARY OF THE INVENTION

In accordance with the present invention, a hollow fiber reinforced structure is provided, which has crossectional variations, curvatures, twists and joints. A method of forming the structure includes placing fibrous material along the walls of an outer mold adapted to be opened and closed. An inflatable bladder providing the inner mold is placed between the fibrous material. The outer mold is closed and the bladder is inflated to hold the fibrous material against the walls of the outer mold. Resin is then injected into the fibrous material. The fibrous material with the resin is then curved to form the fiber reinforced structure.

Other objects and advantages of the present invention will be apparent and suggest themselves to those skilled in the art, from a reading of the following specification and claims taken in conjunction with the accompanying drawings.

DESCRIPTION OF THE INVENTION

Figure 1:
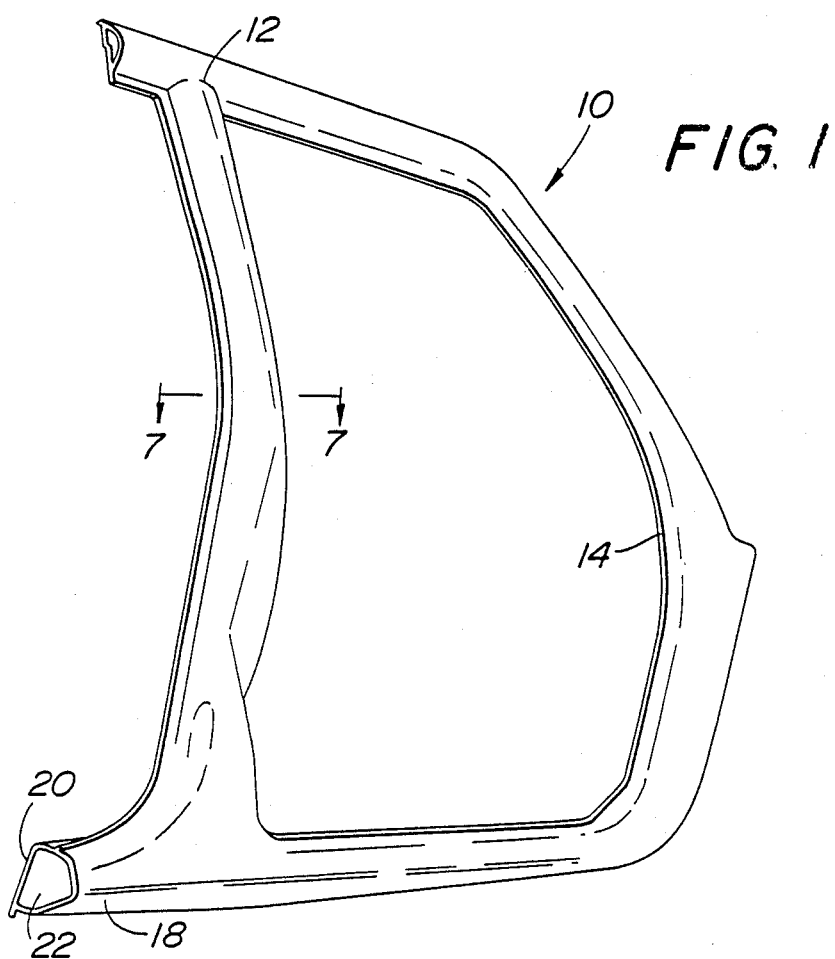
FIG. 1 is an isometric view of an irregular shaped structure of a type which may be made by practicing the present invention.
Figure 7:
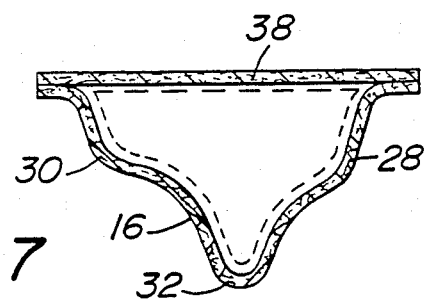

Referring to FIG. 1, a structure 10 illustrates part of a door frame for an automobile. The frame includes joints, such as a joint 12, curved surfaces, such as surface 14 and areas of irregular cross-sectional areas, as illustrated by section 16 (FIG. 7). The single integrally cured structure, 10, was developed from several prelocated, but unimpregnated, fibrous pieces of which 18 and 20 are but two, by subsequent, molding, resin injection and curing steps. A hollow area 22 extends through the structure 10.

Figure 2:
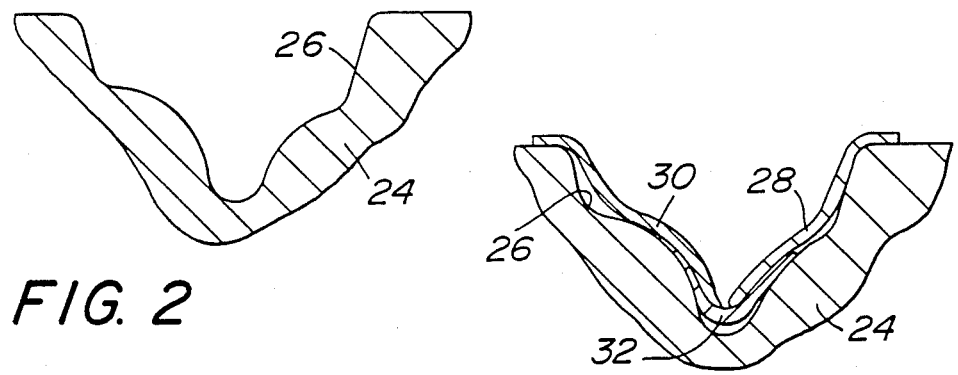
FIGS. 2-7 illustrate steps in a method for forming the structure illustrated in FIG. 1, in accordance with the present invention, with FIG. 7 being a cross-sectional view taken along lines 7-7 of FIG. 1.

Referring to FIG. 2, a rigid lower section 24 of an outer mold is illustrated. The lower section 24 is shaped to the structure or part being formed, for example, the structure 10 illustrated in FIG. 1.

Figure 3:
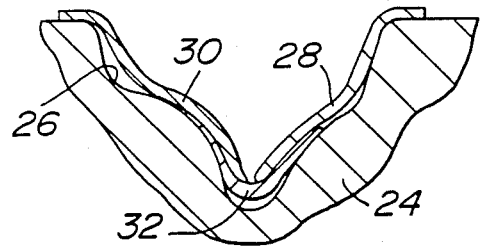

Referring to FIG. 3, dry fibrous material, which may be glass reinforced, for example, is preplaced along the inner wall 26 of the lower mold section 24. In manually preplacing the fibrous material, more than one piece may be required when a cross-sectional area is exceptionally deep. In the embodiment illustrated, three fibrous pieces 28, 30 and 32 are used. It is understood, however, that sometimes only a single piece may be required or even the use of a prehaped piece, such as a preform, may be required.

Figure 4:
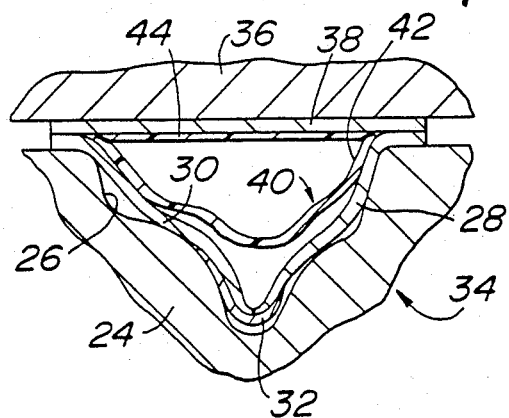

Referring to FIG. 4, the complete rigid outer mold 34 comprises the bottom irregular shaped section 24 and an upper mold section 36. The outer mold 34, comprising upper and lower sections, is adapted to open and close the lower and upper sections 24 and 36 in a conventional manner.

Fibrous material 38 is also preplaced on the upper section 36. Prior to closing the mold 34, an inflatable bladder 40 may include a pair of pieces 42 and 44, which are seamed together after being cut to suitable shapes and sizes generally corresponding to the shape and size of the structure 10. The bladder 40 may be made of plastic or other suitable elastomeric material. The bladder 40 is illustrated partly inflated in FIG. 4, although in practice the pieces 42 and 44 may be flat against each other prior to inflation. While the upper section 36 is illustrated as being flat, it may also be of an irregular shape, such as the lower section 24, with the fibrous material being preplaced therein in the same manner as described with respect to the upper section. While the example shown in FIG. 4 demonstrates the ability to develop a flanged section, the process is equally capable of yielding unflanged, hollow sections.

Figure 5:
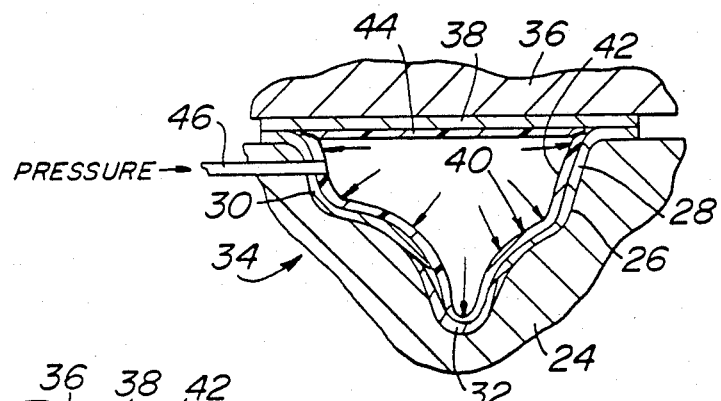

FIG. 5 illustrates air or other suitable gas or medium, such as compressed microballoons, from a pressurized source being applied through a conduit 46 into the bladder 40 to cause it to inflate and force it against the fibrous material which was preplaced on the inner walls of the outer mold 34, The bladder 40 now serves as the inner mold for the next step in the operation.

Figure 6:
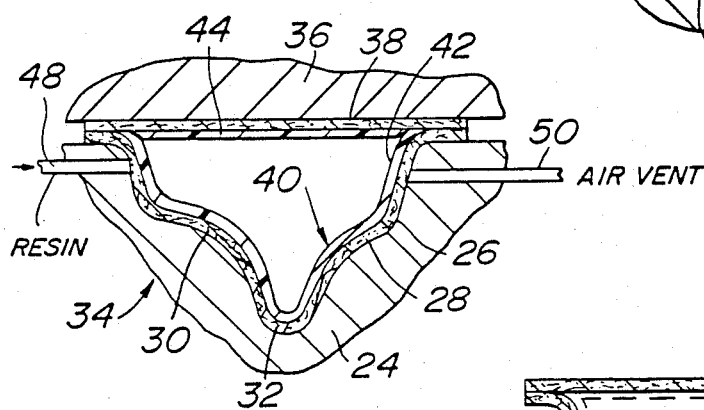

Referring to FIG. 6, resin under pressure is forced through a conduit 48 to impregnate the fibrous material between the bladder 40 and the outer mold 34. An air vent 50 is provided from the fibrous material to atmosphere to assure that there are no voids in the fibrous material when the resin is injected under pressure to impregnate the fibrous material. The broad process of resin transfer molding (RTM) is known in the art.

Following the step of impregnating the fibrous material with resin, a curing operation which depends on the chosen resin catalyst, could either be room temperature or an elevated temperature which involves heating the fibrous material with the resin while under pressure. The curing completes forming of the structure 10. The outer mold 34 may be then opened and the structure removed. Depending on part complexity, bladder material, and resin the bladder may be readily removed or left in place as desired.

The process described may utilize a constant diameter thin wall plastic tube, the diameter of which matches the largest inside perimeter of the molded part. For sections of smaller perimeter dimensions, the excess bladder material, being so thin, does not interfere with the ability to form a smooth wrinkle-free inside molded surface. In fact, with the bladder material being very thin, no expansion of the bladder beyond its unstressed perimeter is desired due to possible rupture.

Carrying the proposed concept further, joints of a hollow frame are possible including complete frames, such as automotive space frames or aircraft structures. Also using the process, molded panels can be combined with hollow members during the same molding. When jointed structures are required, joining tubular plastic bladders are not desired. Instead two flat sheets of the chosen material will be cut and seamed to form the desired bladder. In this way, the disposable low cost bladder can be easily used to form a complete one piece structure including joints.

Important to this process is the reinforcement charge used to load the mold. For most hollow structures anticipated, the cross-sectional area is relatively small. Hence even though large pressures are available to inflate the plastic bladders, relatively small forces are developed. Such forces are in general not sufficient to force the fibrous material tight against all surfaces of a highly complex mold. Hence it is desirable to preform the fibrous material to the correct shape prior to inserting it into the mold. This can be accomplished as a simple preform using chopped fiber reinforcement and a binder.

If the production quantities are small, then the fibrous reinforcement can be cut to the correct size and approximately formed to the correct shape by hand prior to inserting the bladder. In order for the limited force exerted by the bladder to be able to force the reinforcement tight against all surfaces of a highly complex mold, the individual layers must be free to slide, so as not to become locked against a portion of the mold thereby preventing proper reinforcement location.

With many composite structures, hardware attachment is best accomplished by using metallic taping or rivet backup plates. This can be easily satisfied by prelocating metal plates between the reinforcement and the bladder or even between layers of the reinforcement.

If only the skeletal frame of a structure is to be molded, then the mold requirements are simplified. As noted before, the actual developed forces are relatively low. Also, the formed hollow sections are relatively small so no large unsupported expanses of mold are subjected to deforming pressures. As a consequence, the mold, while required to be accurate, need not be massive to withstand the bladder pressures. The complexity of the mold depends on several features such as size, geometry and shape, but in any event, it must capable of being broken down sufficiently to remove the cured part.

What is claimed is:

1. A large molded structural part having a complex shape comprising:
a hollow fiber reinforced plastic member including at least a first and a second section extending in different directions to each other and joined together at a joint, the first and second sections being asymmetrical in cross section and defined by two spaced apart surfaces, at least one surface being irregular shaped and different in configuration than the other surface, and the interior of the hollow member containing a bladder sufficiently resilient to have expanded to the inner faces of the two surfaces during molding of the member.

2. The part of claim 1 wherein said irregular surface is constructed of a plurality of separate pieces of fibrous material which have been impregnated with a resin.

3. The part of claim 2 wherein said plurality of pieces overlie each other along a lateral cross section of the irregular surface.

4. The part of claim 1 wherein said bladder comprises two flat sheets seamed together along edges adjacent to the areas where said first and second surfaces meet.

5. The part of claim 1 in the shape of a door frame for a vehicle.

6. The part of claim 1 wherein said bladder extends continuously throughout the first and second sections and the joint therebetween.

7. The part of claim 1 wherein the part is used in vehicle.

8. The part of claim 1 wherein said sections define an opening for supporting another structural member.

9. The part of claim 8 wherein said another structural member is a vehicle door.

* * * * *